United States Patent
Wnuk

(10) Patent No.: US 9,118,485 B2
(45) Date of Patent: Aug. 25, 2015

(54) USING AN OCSP RESPONDER AS A CRL DISTRIBUTION POINT

(75) Inventor: Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 575 days.

(21) Appl. No.: 12/713,683

(22) Filed: Feb. 26, 2010

(65) Prior Publication Data

US 2011/0213963 A1 Sep. 1, 2011

(51) Int. Cl.
*H04L 9/32* (2006.01)
*H04L 29/06* (2006.01)

(52) U.S. Cl.
CPC .......... *H04L 9/3268* (2013.01); *H04L 63/0823* (2013.01); *H04L 63/06* (2013.01)

(58) Field of Classification Search
CPC .. H04L 9/3268; H04L 9/3263; H04L 63/0823
USPC ...................... 713/155–158, 168, 175; 726/10
See application file for complete search history.

(56) References Cited

U.S. PATENT DOCUMENTS

| | | | | |
|---|---|---|---|---|
| 7,131,003 B2 * | 10/2006 | Lord et al. | ................. | 713/168 |
| 7,328,344 B2 * | 2/2008 | Chang | ......................... | 713/175 |
| 7,353,396 B2 * | 4/2008 | Micali et al. | ................. | 713/176 |
| 7,761,703 B2 * | 7/2010 | Little et al. | ................... | 713/156 |
| 7,814,315 B2 * | 10/2010 | Parkinson | ..................... | 713/158 |
| 7,818,575 B2 * | 10/2010 | Cross et al. | ................... | 713/175 |
| 7,865,720 B2 * | 1/2011 | Little et al. | ................... | 713/156 |
| 7,966,487 B2 * | 6/2011 | Engberg et al. | ............... | 713/156 |
| 8,019,990 B2 * | 9/2011 | Chang | ........................ | 713/156 |
| 8,108,669 B2 * | 1/2012 | Saito et al. | .................... | 713/156 |
| 2004/0093493 A1 * | 5/2004 | Bisbee et al. | ............... | 713/156 |
| 2005/0144463 A1 * | 6/2005 | Rossebo et al. | .............. | 713/185 |
| 2006/0020688 A1 * | 1/2006 | Chang et al. | .................. | 709/219 |
| 2006/0048210 A1 * | 3/2006 | Hildre et al. | ...................... | 726/1 |
| 2006/0294576 A1 * | 12/2006 | Cross et al. | ........................ | 726/1 |
| 2007/0073621 A1 * | 3/2007 | Dulin et al. | ..................... | 705/50 |
| 2008/0034204 A1 * | 2/2008 | Lakshminarayanan | ....... | 713/158 |
| 2009/0210703 A1 * | 8/2009 | Epstein et al. | ................ | 713/157 |
| 2011/0154017 A1 * | 6/2011 | Edstrom et al. | ............... | 713/151 |

* cited by examiner

*Primary Examiner* — Zachary A Davis
(74) *Attorney, Agent, or Firm* — Lowenstein Sandler LLP

(57) ABSTRACT

A certificate status distribution system receives a request from a client pertaining to a status of a certificate and determines whether the client is an online certificate status protocol (OCSP) compliant client. The certificate status distribution system sends the certificate status to the client using OCSP in response to a determination that the client is an OCSP compliant client and sends a certificate revocation list to the client in response to a determination that the client is not an OCSP compliant client.

16 Claims, 4 Drawing Sheets

USING AN OCSP RESPONDER AS A CRL DISTRIBUTION POINT

TECHNICAL FIELD

Embodiments of the present invention relate to certificate revocation list (CRL) distribution. Specifically, the embodiments of the present invention relate to a method and system for using an online certificate status protocol (OCSP) responder as a CRL distribution point.

BACKGROUND

A certificate system provides a security framework to ensure that network resources are accessed by authorized users. The certificate system is capable of generating digital certificates for different users to verify the identity of a presenter. The certificate system can include a Certificate Authority (CA) subsystem to issue and revoke certificates and an Online Certificate Status Responder subsystem to verify whether a certificate is valid. Revoked certificates are certificates that are no longer valid and should no longer be relied upon. A certificate revocation list (CRL) is a list of the revoked certificates and is published by the CA that issued the certificates.

A certificate authority supports the Online Certificate Status Protocol (OCSP). OCSP enables OCSP-compliant clients to determine the state of a certificate, including the revocation status, without having to directly check a certificate revocation list (CRL) published by a CA. An OCSP-compliant client can send a certificate status request to a validation authority, such as an OCSP responder. The OCSP responder can check the status of the certificate for the OCSP-compliant client and return one of three possible statuses: 'good,' revoked,' or 'unknown.' A client can proceed according to a client policy based on the received response.

Not all clients, however, may be OCSP-compliant. Non-OCSP compliant clients may not simply send a status request to an OCSP responder, and instead, must request a copy of a certificate revocation list from a certificate authority. However, a CA may have a significant number of client requests for certificate revocation lists to verify certificate status. A large number of requests can greatly burden the CA resources, and thus, have a negative affect on the performance of a CA.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for using an online certificate status protocol (OCSP) responder as a certificate revocation list (CRL) distribution point. A certificate status distribution system receives a request from a client pertaining to a status of a certificate and determines whether the client is an OCSP compliant client. The certificate status distribution system sends the certificate status to the client using OCSP in response to a determination that the client is an OCSP compliant client and sends a certificate revocation list to the client in response to a determination that the client is not an OCSP compliant client.

Embodiments of the present invention enable non-OCSP compliant clients to directly communicate with an OCSP responder to obtain a CRL from the OCSP responder server, rather than burdening a certificate authority server with such requests. Embodiments of the invention enable an OCSP responder server to serve as a CRL distribution point and thus, help reduce the traffic of CRL requests to a CA server.

Figure 1:
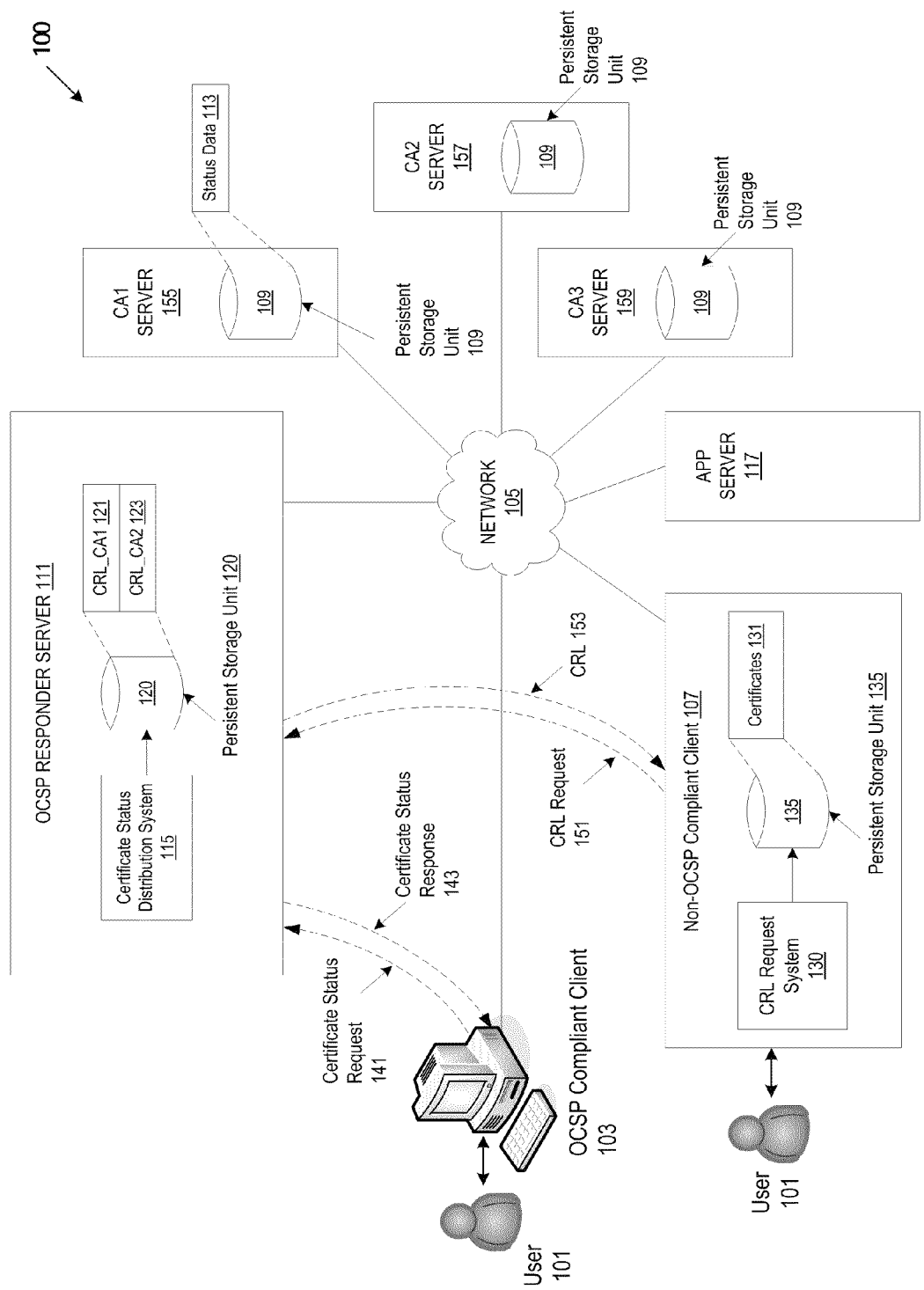
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more Certificate Authority (CA) servers 155-159 to issue digital certificates. For example, a user 101 can use a client 103,107 to send a request (not shown) over network 105 to a CA server 155-159 for a certificate to be issued. The CA server 155-159 can receive the request and can issue a certificate. The CA server 155-159 can maintain status data 113 indicating that the certificate has been issued to a user 101. The status data 113 can be maintained in an internal database. The internal database may be stored in persistent storage unit 109. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

A CA server 155-159 can be any type of computing device including server computers, desktop computers, laptop computers, hand-held computers, or similar computing devices. A client 103,107 can be a smart hand-held device or any type of computing device including desktop computers, laptop computers, mobile communications devices, cell phones, smart phones, hand-held computers or similar computing devices capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

The CA server 155-159 that issued a certificate can also revoke the certificate. For example, a user 101 can use a client 103,107 to send a request (not shown) over network 105 to a CA server 155-159 to revoke a certificate. The CA server 155-159 can receive the revocation request, and can revoke the certificate. The CA server 155-159 can update the status data 113 indicating that the certificate has been revoked. A certificate may be revoked for various reasons, such as the private key associated with the certificate was compromised, the private key associated with the CA that issued the certificate was compromised, the owner of the certificate is no longer affiliated with the issuer, a certificate has been replaced, the issuing CA has ceased to operate, etc.

A client 103,107 or an application server 117 may need to determine the status of a certificate, such as whether the certificate is valid or has been revoked. For example, a user 101 may use a client 103,107 to browse a company website store, which is hosted by an application server 117, to make a purchase. A web browsing application on the client 103,107 may need to verify the validity of an SSL (Secure Sockets Layer) certificate of the company web store prior to a user 101 making a purchase. In another, a banking application may be hosted by application server 117. A user 101 may use a client 103,107 to attempt to login to the banking application using a certificate for access to a bank account. Prior to granting account access to the user 101, the application server 117 may need to determine whether the certificate is valid or has been revoked.

To allow clients 103,107 and application servers 117 to determine the status of a certificate, a CA server 155-159 can generate and publish a list of revoked certificates, known as a certificate revocation list (CRL). A CRL is a publicly available list of certificates that have been revoked. A CA server 155-159 can use the status data 113 to generate a CRL. The CA server 155-159 can publish a CRL to an online certificate status protocol (OCSP) responder server 111.

The network architecture 100 can include one or more OCSP responder servers 111 for hosting an OCSP service for verifying the current status of a certificate. An OCSP responder server 111 can be any type of computing device including server computers, desktop computers, laptop computers, hand-held computers, or similar computing devices.

An OCSP responder server 111 can communicate with an OCSP compliant client 103 to provide the status of a certificate to the OCSP compliant client 103 using the online certificate status protocol. OCSP enables an OCSP compliant client 103 to determine the status of a certificate without having the OCSP compliant client 103 have to receive a copy of a CRL and have to search the CRL for the certificate to determine the certificate status. An OCSP compliant client 103 can use the online certificate status protocol to send a certificate status request 141 to an OCSP responder server 111. An OCSP responder server 111 can include a persistent storage unit 120 for storing certificate revocation lists (e.g., CRLs 121,123). The OCSP responder server 111 can receive the certificate status request 141 and can check the data (e.g., CRLs 121,123) in the persistent storage unit 120 for the status of the certificate. The OCSP responder server 111 can use the online certificate status protocol to send a certificate status response 143 that indicates the status of a certificate to the OCSP compliant client 103. The status may be a response, such as 'good' or 'verified,' 'revoked,' or 'unknown.'

In conventional methods, a non-OCSP compliant client 107 cannot simply request and receive the status of a certificate from an OCSP responder server 111. Conventionally, a non-OCSP compliant client 107 sends a request (not shown) to receive a copy of a CRL from a CA server 155-159. The non-OCSP compliant client 107 receives a copy of a CRL and searches the CRL for the certificate to determine the status of the certificate. A CA server 155-159, however, may have received a significant number of client requests for CRLs to verify certificate status. A large number of requests can greatly burden the CA server resources, and thus, have a negative affect on the performance of a CA server. A CA server 155-159 may also be busy handling requests to issue and revoke certificates. Thus, a non-OCSP compliant client 107 may not easily receive a copy of a CRL from the CA server 155-159.

Embodiments of the invention enable an OCSP responder server 111 to serve as a CRL distribution point and thus, allow non-OCSP compliant clients 107 to direct CRL requests to the OCSP responder server 111. Embodiments of the invention help reduce the traffic of CRL requests to a CA server 155-159.

A non-OCSP compliant client 107 can include a CRL request system 130 to communicate with an OCSP responder server 111 for obtaining a CRL. An application server which is non-OCSP compliant (not shown) can include a CRL request system. The CRL request system 130 can identify and receive a certificate that needs to be validated. The CRL request system 130 can store the certificate 131 in a persistent storage unit 135. The CRL request system 130 can determine which OCSP responder server to send a CRL request 151 to by examining distribution point data in the certificate that is to be validated. A CRL distribution point is an entity, such as an OCSP responder server 111, to which a client 101 can refer in order to ascertain if a certificate has been revoked.

An OCSP responder server 111 can include a certificate status distribution system 115 for distributing a CRL using the OCSP responder as a CRL distribution point. A certificate status distribution system 115 can receive a request 141,151 pertaining to the status of a certificate. The request 141,151 can include the certificate to be validated. The request may be a certificate status request 141 from an OCSP compliant client 103 or a CRL request 151 from a non-OCSP compliant client 107. The certificate status distribution system 115 can determine if the request is from a compliant or non-OCSP compliant client, for example, by examining the port which the request is received on. When a request is from an OCSP compliant client 103, the certificate status distribution system 115 can check the data in the persistent storage unit 120 for the status of the certificate and use the online certificate status protocol to return a certificate status response 143 that indicates the status of a certificate.

When a request is from a non-OCSP compliant client 107, the certificate status distribution system 115 can send the non-OCSP compliant client 107 a CRL pertaining to a certificate. The CRL request 151 can include the certificate to be validated. The certificate status distribution system 115 can identify the certificate authority that issued the certificate by examining the certificate in the request 151 to find a corresponding CRL. The certificate status distribution system 115 can search the persistent storage unit 120 for a CRL that corresponds to the issuing CA and can send the corresponding CRL to the non-OCSP compliant client 107. For example, the certificate status distribution system 115 may determine from the certificate that the issuing CA server is CA2 server 157 and the certificate status distribution system 115 may find CRL_CA2 123 which corresponds to CA2 server 157. A non-OCSP compliant client 107 can search the CRL (e.g., CRL_CA2 123) for the certificate to determine the status of the certificate.

If the certificate status distribution system 115 cannot locate a CRL in the persistent storage unit that corresponds to the issuing CA, the certificate status distribution system 115 can send a message to the non-OCSP compliant client 107 that a CRL is not found. For example, the certificate status distribution system 115 may determine from the certificate that the issuing CA server is CA3 server 159, but the OCSP responder server 111 may not have received a CRL from the CA3 server 159.

The certificate status distribution system 115 and CRL request system 130 can be implemented as hardware, computer-implemented software, firmware or a combination thereof. In one embodiment, the certificate status distribution system 115 or CRL request system 130 comprises instructions stored in memory 404 that cause a processing device 402 in FIG. 4 described in greater detail below to perform the functions of the a certificate status distribution system 115 or a CRL request system 130.

Figure 2:
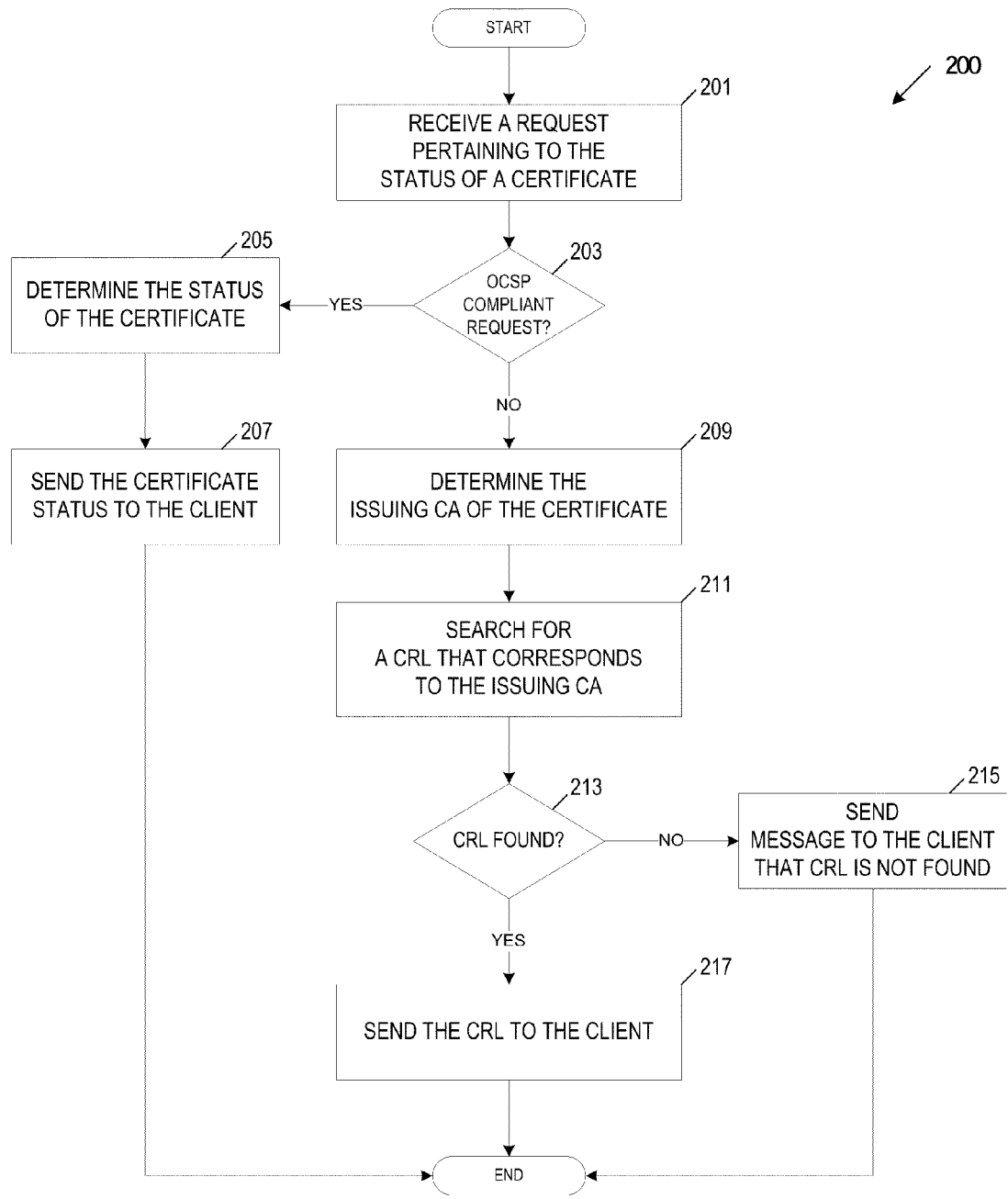
FIG. 2 is a flow diagram which illustrates an embodiment of a method for distributing a certificate revocation list (CRL) using an online certificate status protocol (OCSP) responder as a CRL distribution point.

FIG. 2 is a flow diagram which illustrates an embodiment of a method 200 for distributing a certificate revocation list (CRL) using an online certificate status protocol (OCSP)

responder as a CRL distribution point. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the certificate status distribution system 115 in an OCSP responder server 111 of FIG. 1.

The certificate status distribution system can store and maintain a CA signing certificate for a CA server and a certificate revocation list corresponding to the CA server in a persistent storage unit. A system administrator can configure an OCSP responder server to receive a published CRL from a CA server for which the OCSP responder server stores a CA signing certificate associated with the CA server. If an OCSP responder server does not store the CA signing certificate for a CA server, the OCSP responder server may not receive a CRL from that particular CA server. For example, the OCSP responder server may store the CA signing certificate for CA1 server. The OCSP responder server may receive CRL_CA1 from CA1 server. The OCSP responder server may not store the CA signing certificate for CA3 server and thus, may not receive a CRL from CA3 server. The certificate status distribution system can store a CA signing certificate and a corresponding CRL for more than one CA server. A CRL can include the name of the issuing CA that published the list.

At block 201, the certificate status distribution system receives a request pertaining to the status of a certificate. The request may be from a client that needs to determine whether a certificate has been revoked. The request can include the certificate to be validated. For example, a user may browse a company web store to make a purchase. The web browsing application may attempt to verify the validity of the SSL certificate of the company web store by sending a request to the certificate status distribution system. The certificate status distribution system can receive a request that includes the certificate for the web store.

The request may be from an OCSP compliant client or a non-OCSP compliant client. At block 203, the certificate status distribution system determines whether the request is from a compliant or non-OCSP compliant client. The certificate status distribution system can determine whether the request is from a compliant or non-OCSP compliant client by examining the port which the request is received on. The certificate status distribution system can receive OCSP requests on a port different from the port that can receive non-OCSP compliant requests. If the request is from an OCSP compliant client (block 203), the certificate status distribution system determines the status of the certificate at block 205 and sends the status to the OCSP compliant client at block 207 using the online certificate status protocol. The certificate status distribution system can determine the certificate status by identifying the name of the CA that issued the certificate from the certificate data. The certificate status distribution system can determine the status of the certificate from a CRL that corresponds to the name of the issuing CA.

At block 207, the certificate status distribution system sends the certificate status to the OCSP compliant client using the online certificate status protocol and the method ends. The status may be one of three responses, 'good' or 'verified,' 'revoked,' or 'unknown.' A status of 'good' or 'verified' can specify a positive response to the status request, meaning that the certificate has not been revoked. The status may not necessarily mean that the certificate was issued or that is it within the certificate's validity interval. A status of 'revoked' can specify that the certificate has been revoked, either permanently or temporarily. A status of 'unknown' may be attributed to an OCSP responder server not storing a CRL for a particular CA server. For example, the OCSP responder server may not store the CA signing certificate for CA3 server and thus, may not determine the status of a certificate that is issued by CA3 server. A client can determine whether to validate the certificate based on the received status. For example, the client may not send an email message, may not decrypt web content, etc.

If the request is from a non-OCSP compliant (block 203), the request is a request for a CRL that corresponds to the certificate. At block 209, the certificate status distribution system identifies the certificate authority that issued the certificate by examining the certificate data. A certificate can contain a name of a CA that issued the certificate. For example, the certificate status distribution system may receive a request from the web browsing application for a CRL pertaining the certificate of the web store. The certificate status distribution system may determine from the web store certificate that the issuing CA server is CA3 server.

At block 211, the certificate status distribution system searches the persistent storage unit for a CRL that corresponds to the issuing CA (e.g., CA3 server). The certificate status distribution system can search for a CA name that matches the name of the issuing CA in the certificate data. If a matching CA name is not found (block 213), the certificate status distribution system sends a message to the non-OCSP compliant client that a certificate revocation list is not found at block 215 and the method ends. For example, the certificate status distribution system may determine from the certificate that the issuing CA server is CA3 server, but the OCSP responder server may not have received a CRL from the CA3 server because the OCSP responder server does not store a signing certificate for CA3 server. The certificate status distribution system can send a message to the non-OCSP compliant client that a CRL for the issuing server, CA3 server, is not found. A client can proceed according to a client policy based on the received response. For example, the client may not send an email message, may not decrypt web content, etc.

If a matching CA name is found (block 213), the certificate status distribution system identifies a CRL that corresponds to the CA name. For example, the certificate status distribution system may determine from the web store certificate that the issuing CA server is CA1 server. The certificate status distribution system may identify that CRL_CA1 is the CRL that corresponds to CA1 server. At block 217, the certificate status distribution system can send the CRL_CA1 to the non-OCSP compliant client and the method ends. A non-OCSP compliant client can search the CRL (e.g., CRL_CA1) to determine the status of the certificate. A client can proceed according to a client policy based on the received response. For example, the client may send an email message, may decrypt web content, etc.

Figure 3:
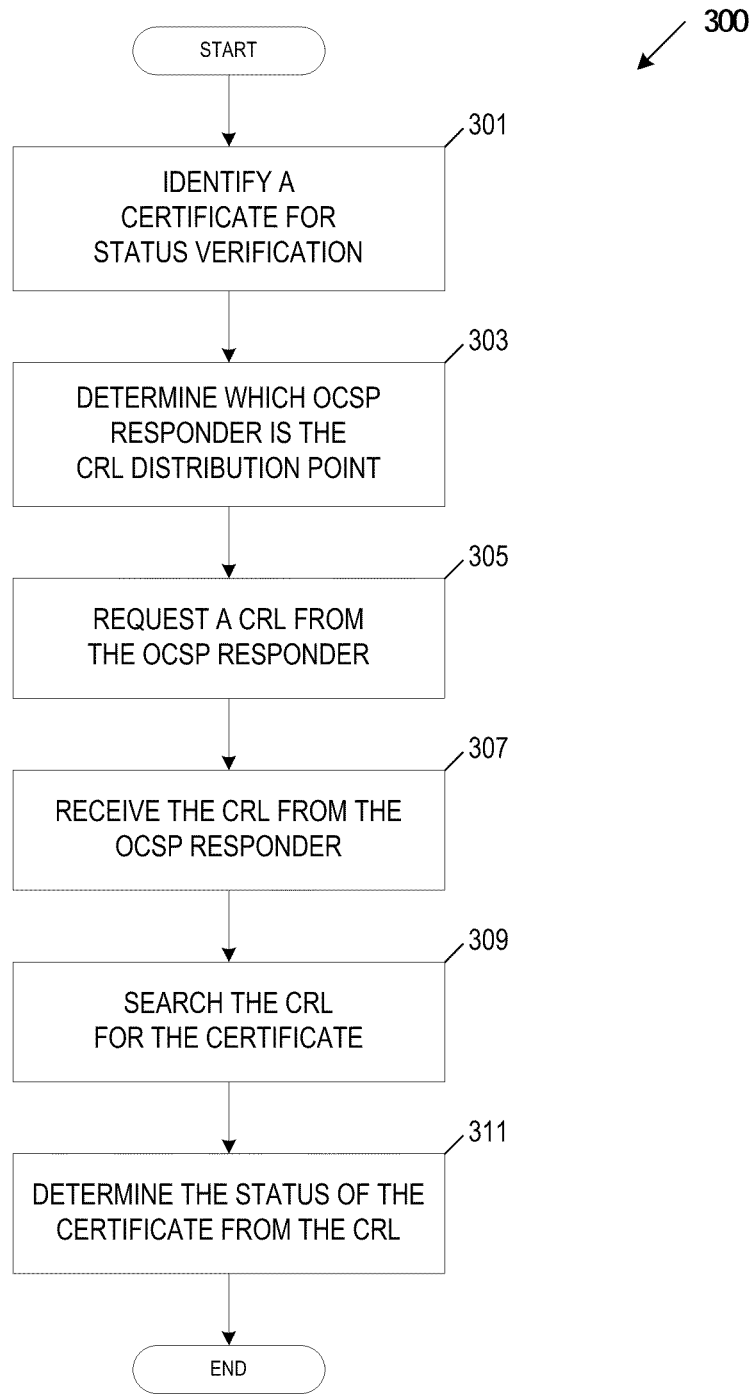
FIG. 3 is a flow diagram which illustrates an embodiment of a method for obtaining a CRL using an OCSP responder as a CRL distribution point.

FIG. 3 is a flow diagram which illustrates an embodiment of a method 300 for obtaining a CRL using an OCSP responder as a CRL distribution point. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the CRL request system 130 in a client system, such as the non-OCSP compliant client 107 of FIG. 1.

Certificates to be validated may be stored in a persistent storage unit. A non-OCSP compliant client may need to determine whether a certificate being validated has been revoked. For example, a user may browse a company web store to make a purchase and the web browsing application may need to verify the validity of the SSL certificate of the company web store. At block 301, the CRL request system can identify a certificate to be validated (e.g., the certificate of the company web store).

At block 303, the CRL request system determines which OCSP responder server is a CRL distribution point for the certificate. A certificate can include the name of the certificate authority that issued the certificate and can contain a distribution point extension field that identifies the distribution point. The distribution point extension can include a URL that points to a network location for a CRL distribution point. For example, the certificate may indicate the CRL distribution point using the network location of an OCSP responder server and that CA2 server is the name for the issuing CA server that published the CRL.

At block 305, the CRL request system sends a request for a certificate revocation list pertaining to the certificate to the OCSP responder server that is identified as the CRL distribution point. At block 307, the CRL request system receives the CRL from the OSCP responder server. The CRL request system can store the CRL in a persistent storage unit. At block 309, the CRL request system searches the CRL for the certificate and determines the status of the certificate from the information in the CRL at block 311. A client can proceed according to a client policy based on the received response. For example, the client may send an email message, may decrypt web content, etc.

Figure 4:
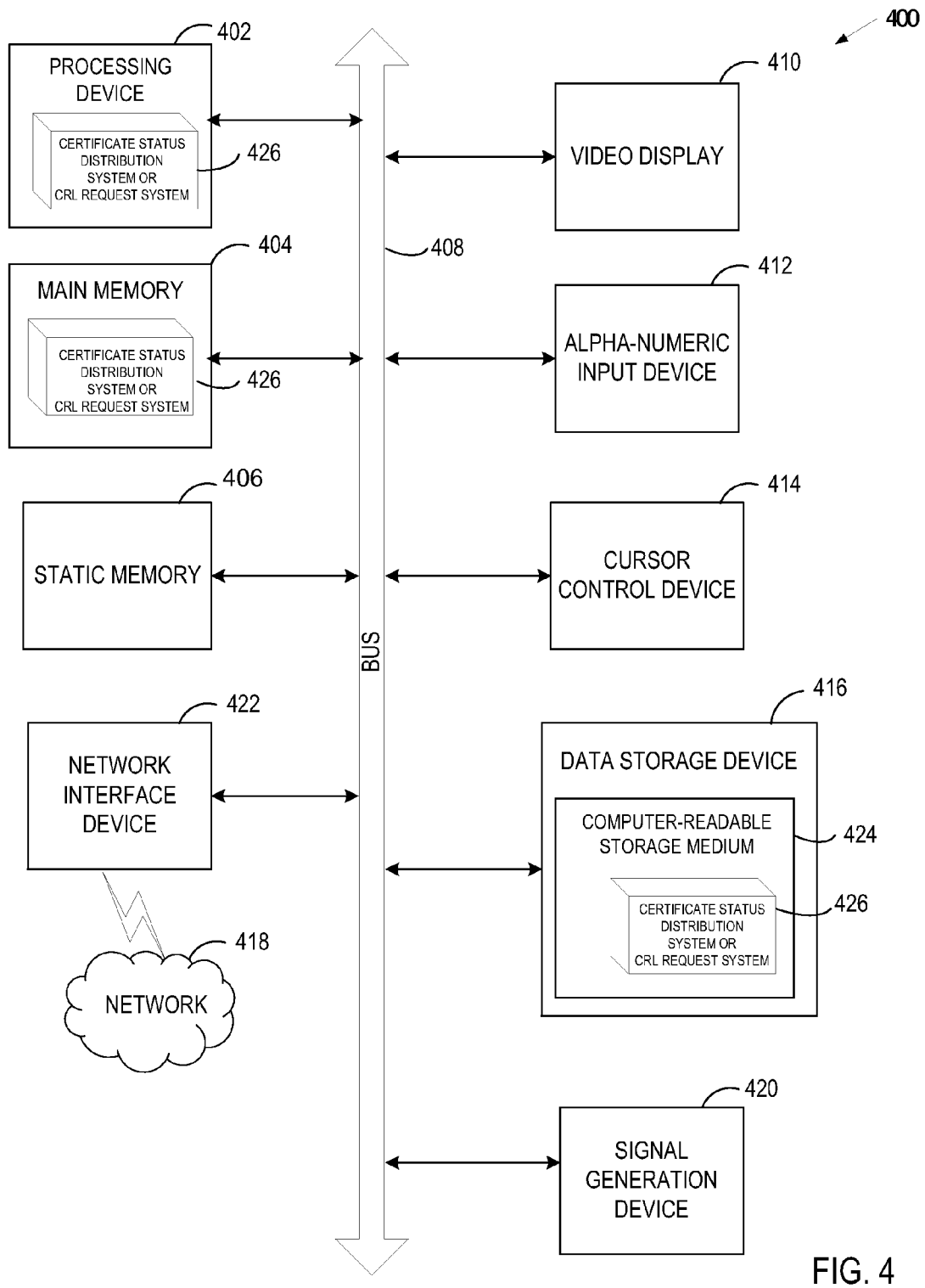
FIG. 4 is a diagram of one embodiment of a certificate status distribution system or a CRL request system.

FIG. 4 is a diagram of one embodiment of a computer system for distributing a certificate revocation list (CRL) using an online certificate status protocol (OCSP) responder as a CRL distribution point. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage media), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute a certificate status distribution system or a CRL request system 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the certificate status distribution system or the CRL request system 426) embodying any one or more of the methodologies or functions described herein. The certificate status distribution system or the CRL request system 426 may also reside, completely or at least partially, within the main memory 404 and/or within the processing device 402 during execution thereof by the computer system 400, the main memory 404 and the processing device 402 also constituting machine-readable storage media. The certificate status distribution system or the CRL request system 426 may further be transmitted or received over a network 418 via the network interface device 422.

The computer-readable storage medium 424 may also be used to store the certificate status distribution system or the CRL request system 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The certificate status distribution system or the CRL request system 426, components and other features described herein (for example in relation to FIG. 1) can be implemented as discrete hardware components or integrated in the functionality of hardware components such as ASICS, FPGAs, DSPs or similar devices. In addition, the certificate status distribution system or the CRL request system 426 can be implemented as firmware or functional circuitry within hardware devices. Further, the certificate status distribution system or the CRL request system 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing," "receiving," "determining," "searching," "sending," "identifying," "examining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for distributing a CRL using an OCSP responder as a CRL distribution point. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
  receiving, by a processing device, a request from a client pertaining to a certificate;
  determining, by the processing device, whether the client is or is not online certificate status protocol (OCSP) compliant; and
  sending, by the processing device and to the client, a status of the certificate in response to determining that the client is OCSP compliant or a certificate revocation list (CRL) corresponding to a certificate authority that issued the certificate in response to determining that the client is not OCSP compliant.

2. The method of claim 1, wherein determining whether the client is or is not OCSP compliant comprises:
  determining a port at which the request from the client was received; and
  determining whether the client is or is not OCSP compliant based on in view of the determined port.

3. The method of claim 1, wherein sending the CRL comprises:
  storing a plurality of certificate revocation lists (CRLs), wherein each of the plurality of CRLs corresponds to a respective one of a plurality of certificate authorities;
  receiving the certificate from the client;
  identifying one of the plurality of certificate authorities from data in the certificate; and
  identifying one of the plurality of CRLs that corresponds to the one of the plurality of certificate authorities.

4. A method comprising:
  identifying, by a processing device, a certificate;
  identifying, by the processing device, one of a plurality of online certificate status protocol (OCSP) responder servers that is a certificate revocation list (CRL) distribution point for the certificate; and
  sending, by the processing device, a request for the CRL pertaining to the certificate to the one of the plurality of OCSP responder servers on a port, the port indicating whether the request is OCSP compliant.

5. The method of claim 4, further comprising receiving the CRL in response to the port indicating that the request is not OCSP compliant or receiving a status of the certificate in response to the port indicating that the request is OCSP compliant.

6. The method of claim 4, wherein identifying one of the plurality of OCSP responder servers that is the CRL distribution point comprises:
  examining an extension in the certificate.

7. A system comprising:
  a memory;
  a processing device operatively coupled to the memory, the processing device configured to:
    receive a request from a client pertaining to a certificate;
    determine whether the client is or is not online certificate service protocol (OCSP) compliant; and
    send, to the client, a status of the certificate in response to determining that the client is OCSP compliant or a certificate revocation list (CRL) corresponding to a certificate authority that issued the certificate in response to determining that the client is not OCSP compliant.

8. The system of claim 7, wherein to determine whether the client is or is not OCSP compliant, the processing device is further configured to:
   determine a port at which the request from the client was received; and
   determine whether the client is or is not OCSP compliant in view of the determined port.

9. The system of claim 7, wherein to send the CRL, the processing device is further configured to:
   receive the certificate;
   identify an issuing certificate authority that corresponds to the certificate from data in the certificate; and
   search a plurality of certificate revocation lists for the CRL that corresponds to the issuing certificate authority for the certificate.

10. A system comprising:
   a memory;
   a processing device operatively coupled to the memory, the processing device configured to:
      identify one of a plurality of online certificate status protocol (OCSP) responder servers that is a certificate revocation list (CRL) distribution point storing the CRL for the certificate; and
      send a request for the CRL to the one of the plurality of OCSP responder servers on a port, the port indicating whether the request is OCSP compliant.

11. The system of claim 10, wherein to identify one of the plurality of OCSP responder servers that is the CRL distribution point, the processing device is further configured to:
   examine an extension in the certificate.

12. A non-transitory computer-readable storage medium including instructions that, when executed by a processing device, cause the processing device to:
   receive a request from a client pertaining to a certificate;
   determine whether the client is or is not online certificate status protocol (OCSP) compliant; and
   send to the client, a status of the certificate in response to determining that the client is OCSP compliant or a certificate revocation list (CRL) in response to determining that the client is not OCSP compliant.

13. The non-transitory computer-readable storage medium of claim 12, wherein to determine whether the client is or is not OCSP compliant, the instructions further cause the processing device to:
   determine a port at which the request from the client was received; and
   determine whether the client is or is not OCSP compliant in view of the determined port.

14. The non-transitory computer-readable storage medium of claim 12, wherein to send the CRL, the instructions further cause the processing device to:
   store a plurality of certificate revocation lists (CRLs), wherein each of the plurality of CRLs corresponds to a respective one of a plurality of certificate authorities;
   receive the certificate from the client;
   identify one of the plurality of certificate authorities from data in the certificate; and
   identify one of the plurality of CRLs that corresponds to the one of the certificate authorities.

15. A non-transitory computer-readable storage medium including instructions that, when executed by a processing device, cause the processing device to:
   identify a certificate;
   identify one of a plurality of online certificate status protocol (OCSP) responder servers that is a certificate revocation list (CRL) distribution point storing the CRL for the certificate; and
   send a request for the CRL pertaining to the certificate to the one of the plurality of OCSP responder servers on a port, the port indicating whether the request is OCSP compliant.

16. The non-transitory computer-readable storage medium of claim 15, wherein to identify one of the plurality of OCSP responder servers that is the CRL distribution point, the instructions further cause the processing device to:
   examine an extension in the certificate.

\* \* \* \* \*